US009636529B1

(12) United States Patent
Murray

(10) Patent No.: US 9,636,529 B1
(45) Date of Patent: May 2, 2017

(54) STOVETOP FIRE SUPPRESSOR MOUNTING DEVICE AND METHOD

(71) Applicant: Donald W Murray, Arlington, TX (US)

(72) Inventor: Donald W Murray, Arlington, TX (US)

(73) Assignee: WilliamsRDM, Inc., Fort Worth, TX (US)

( * ) Notice: Subject to any disclaimer, the term of this patent is extended or adjusted under 35 U.S.C. 154(b) by 800 days.

(21) Appl. No.: 13/896,691

(22) Filed: May 17, 2013

Related U.S. Application Data

(60) Provisional application No. 61/769,737, filed on Feb. 26, 2013.

(51) Int. Cl.
*F16B 43/00* (2006.01)
*A62C 3/00* (2006.01)

(52) U.S. Cl.
CPC .................................... *A62C 3/006* (2013.01)

(58) Field of Classification Search
CPC ...................................................... A62C 3/006
USPC ...................................................... 411/371.2
See application file for complete search history.

(56) References Cited

U.S. PATENT DOCUMENTS 2,219,178 A * 10/1940 Eagle .................. A62C 13/003 222/399
2,387,125 A * 10/1945 Derby ..................... E05B 47/00 74/2
3,040,815 A 6/1962 Pambello
3,209,837 A 10/1965 Freedman
3,773,111 A 11/1973 Dunn
3,833,063 A 9/1974 Williams
3,874,458 A 4/1975 Williams
3,884,306 A 5/1975 Williams
3,884,307 A 5/1975 Williams
3,897,828 A 8/1975 Glover
3,918,526 A 11/1975 Hattori
4,011,911 A 3/1977 Gow
4,113,020 A 9/1978 Panetta
4,964,469 A 10/1990 Smith
5,351,760 A 10/1994 Tabor
5,518,075 A * 5/1996 Williams ............... A62C 35/08 169/28
5,628,367 A 5/1997 Truax et al.
5,868,205 A 2/1999 Cunningham et al.
5,871,057 A 2/1999 Stehling et al.

(Continued)

*Primary Examiner* — Gary Estremsky
(74) *Attorney, Agent, or Firm* — Morani Patent Law, PC

(57) ABSTRACT

A mounting device and method of mounting an automatic stovetop fire suppressor are provided herein. Stovetop fires are a well-known residential and commercial hazard. Common parts are utilized across the stovetop fire suppressors employed in different stovetop configurations, reducing inventory count. The mount design can be automated for greater efficiency of time and labor and may provide increased production or throughput. A magnet is attached at the factory for the vent hood product, eliminating the need for such assembly by an end user. This attachment also alleviates loss or misplacement of the magnet during unpacking or installation. A threaded insert is staked to the fire suppressor can and affords reliable retention of the magnet to the fires suppressor can. The present designs enables formation of a consistent vent area in the fire suppressor can.

13 Claims, 8 Drawing Sheets

(56) References Cited

U.S. PATENT DOCUMENTS

| | | | | |
|---|---|---|---|---|
| 5,881,819 | A | 3/1999 | Walters et al. | |
| 5,899,278 | A | 5/1999 | Mikulec | |
| 6,029,751 | A | 2/2000 | Ford et al. | |
| 6,105,677 | A * | 8/2000 | Stager | A62C 37/12 169/26 |
| 6,244,353 | B1 | 6/2001 | Greer | |
| 6,276,461 | B1 | 8/2001 | Stager | |
| 6,796,382 | B2 | 9/2004 | Kaimart | |
| 7,182,143 | B2 | 2/2007 | Hall et al. | |
| 7,472,758 | B1 * | 1/2009 | Stevens | A62C 35/08 102/322 |
| 7,610,966 | B1 | 11/2009 | Weintraub et al. | |
| 7,934,564 | B1 | 5/2011 | Stell et al. | |
| 7,969,296 | B1 | 6/2011 | Stell | |
| 8,294,567 | B1 | 10/2012 | Stell | |

* cited by examiner

STOVETOP FIRE SUPPRESSOR MOUNTING DEVICE AND METHOD

CROSS REFERENCE TO RELATED APPLICATIONS

This application claims priority to U.S. Provisional Application No. 61/769,737, filed 26 Feb. 2013, the entire contents of which are incorporated herein by reference

FIELD OF THE INVENTION

The present invention relates to device and method of fire suppression, and more particularly to mounting an automatic stovetop fire suppressor.

BACKGROUND OF THE INVENTION

Stovetop fires are a well-known residential and commercial hazard. An unattended stovetop fire, for example a grease fire, can cause damage to nearby appliances and cabinets. Worse, stovetop fires can lead to structural damage or injury. Because the propensity for stovetop fires is so pervasive, an efficient means of automatic fire suppression is desired. Even if a stovetop fire is attended, an automatic extinguishing method may be more effective and expedient compared to manual means.

A number of conventional automatic stovetop fire extinguishers, which mount above the stovetop surface, are available. These include: U.S. Pat. No. 6,276,461 to Stager; U.S. Pat. No. 6,105,677 to Stager; U.S. Pat. No. 5,899,278 to Mikulec; U.S. Pat. No.: 7,472,758 to Stevens and Weintraub; U.S. Pat. No.: 7,610,966 to Weintraub et al; U.S. Pat. No. 5,518,075 to Williams; and U.S. Pat. No. 3,884,307 to Williams. The array of conventional fire suppression systems vary from pendulum swing apparatus (Stager '461), to canister systems (Williams '307 and Stager '677), or to tube connecting systems for liquid effluent (Mikulec). The mounting mechanism for these systems similarly vary from interconnected tubing (Mikulec) to pendulum anchors (Stager '461), to bolts (Stager '677), or to magnetic systems requiring assembly (Williams '307 and Williams '075).

Conventional fire suppressors which are particularly well suited to a stovetop environment include a container of an extinguishing agent and are mounted to a vent hood above the stovetop. An example of such an extinguisher is shown in FIG. 1. The bottom wall or lid 20 of the container 40 contains a fuse 10. A fire on the stovetop ignites the fuse 10, which in turn detonates an igniter 30. The igniter 30 opens the bottom 20 of the container 40, thereby allowing the disbursement of the extinguishing agent 49 onto the fire and the stovetop. The container is secured via a magnet 50 to a hood over the stove. Clevis pin 56 has a shoulder 52 and a felt washer 58 is sandwiched between shoulder 52 and an inside of the top 48 of the container 40. A clevis pin 56 passes through a hole in the top 48 of the suppressor container 40. The clevis pin 56 has a shoulder 58 on an inner side of the container 40 and is held in place by a retaining ring 55 on the outside of the container. Through the eye 53 of the clevis pin 56, a ring 57 is threaded and the same ring is attached to an eyelet 59 of a magnet housing 54 forming a mounting mechanism for the stove top fire suppressor.

Although not shown, the ring 57 attaching the magnet housing to the clevis pin 56 is split, similar to a conventional split ring or key ring. In conventional practice, the attachment of the magnet-ring 54, 59, 57 assembly to the clevis pin 56, eye 53 is performed by the end user, and may be performed at the time of installation of the stovetop fire suppressor. The mounting mechanism with the split ring connection affords reliable and effective stovetop fire suppressor performance. However, this attachment can be difficult for the end user and time consuming if multiple fire suppressors are being installed. it would be desirable to develop a cost efficient system and method which provides the advantages of the ring-based mounting system without requiring the end user to secure the ring 57 to the eye 53 of the clevis pin 56.

FIG. 2 shows another fire suppressor mounting configuration for use with a system such as that taught in U.S. Pat. No. 7,610,966 to Weintraub et al. This configuration particularly accommodates mounting under a micro-hood. The micro-hood fire suppressor includes a can 40, lid assembly 20, clevis pin 2-56, felt washer 2-58 and a retaining ring 2-55. The clevis pin has an undercut 2-53 near one end and a shoulder 2-52 on the opposite end. The undercut 2-53 in the clevis pin 2-56 mates with a slot on a bracket (not shown) to mount the device in position under the micro-hood. Such a mounting configuration is described in the '966 patent, for example.

SUMMARY OF THE INVENTION

The present invention addresses some of the issues presented above by providing a mounting device and method for a stovetop fire suppressor, which does not require assembly by the end user, is cost efficient, and still affords effective stovetop fire extinguishing performance. Aspects of the present invention are provided for summary purposes and are not intended to be all inclusive or exclusive. Embodiments of the present invention may have any of the aspects below.

Attaching the split ring to the clevis pin eye on the vent-hood fire suppressor is a difficult and very time consuming task. The time demands and mechanical coupling challenges are multiplied for maintenance personnel installing the vent hood fire suppressor in multiple units or dwellings. In fact, end users have commented on this task of attaching the ring to the clevis pin. At times, magnets are lost and an end user may be further frustrated and would be unable to mount the stovetop fire suppressor as designed. Conventionally, the magnets are not attached to the containers, respectively, at the factory. Manually attaching the magnet mount to the clevis pin via the ring at the time of manufacture would not be efficient and could be cost prohibitive.

The current installation or manufacturing process for the incorporations of the respective clevis pins into the tops of the stovetop fire suppressors is a manual operation that is cumbersome and time consuming for both the vent hood and micro-hood products. The two different clevis pin configurations may require separate and distinct handling means in an automated assembly system.

One aspect of the present invention is to provide a user friendly method of installing a stovetop fire suppressor.

Another aspect of the present invention is provide an automated assembly for the combining of a fire extinguishing container and a mounting device, which can be incorporated into a vent-hood mount or into a micro-hood mount.

Another aspect of the present invention is to provide a mounting device for a vent-hood stovetop fire suppressor which does not require additional assembly by the end user.

Another aspect of the present invention is to provide a mounting device for a micro-hood which reduces manual manufacturing steps.

Yet another aspect of the present invention is to provide a venting means for the fire extinguishing container, which is readily manufactured.

Yet another aspect of the present invention is to provide a consistent manufactured venting means for the fire extinguishing container.

Another aspect of the present invention is a mounting device and method which affords full and proper function of a stovetop fire suppressor mounted beneath a vent hood.

Another aspect of the present invention is a mounting device and method which affords full and proper function of a stovetop fire suppressor mounted beneath a micro-hood.

Another aspect of the present invention is that a closed fire extinguishing container can be fitted for vent hood or micro-hood mounting.

Another aspect of the present invention is the ability to use off the shelf parts in the mounting device.

Another aspect of the present invention is relative ease of use in employment of the present invention in field applications.

Another aspect of the present invention is the reduction in bench or inventory parts for assembly of stovetop fire suppressors across different mounting configurations.

Still another aspect of the present invention the reduction in manual labor associated with manufacturing the stovetop fire suppressor in accordance with embodiments of the present invention.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein.

DETAILED DESCRIPTION OF THE INVENTION

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are illustrative of ways to make and use the invention, and are not intended to limit the scope of the invention. Same reference numbers across figures refer to like elements for ease of reference. Reference numbers may also be unique to a respective figure or embodiment.

Figure 1:
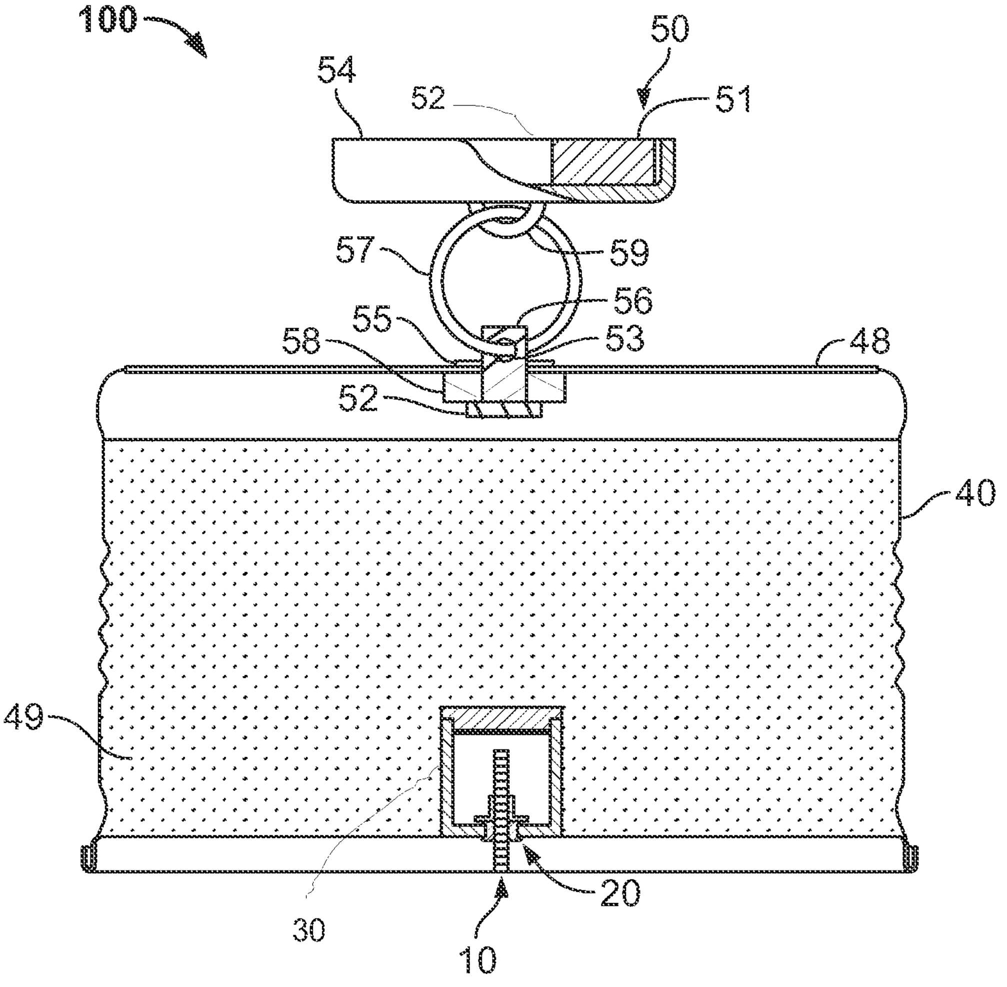
FIG. 1 Prior Art
FIG. 1 shows a partial cross section of a conventional stovetop fire suppressor for mounting under a vent-hood taken through the axial center.
Figure 2:
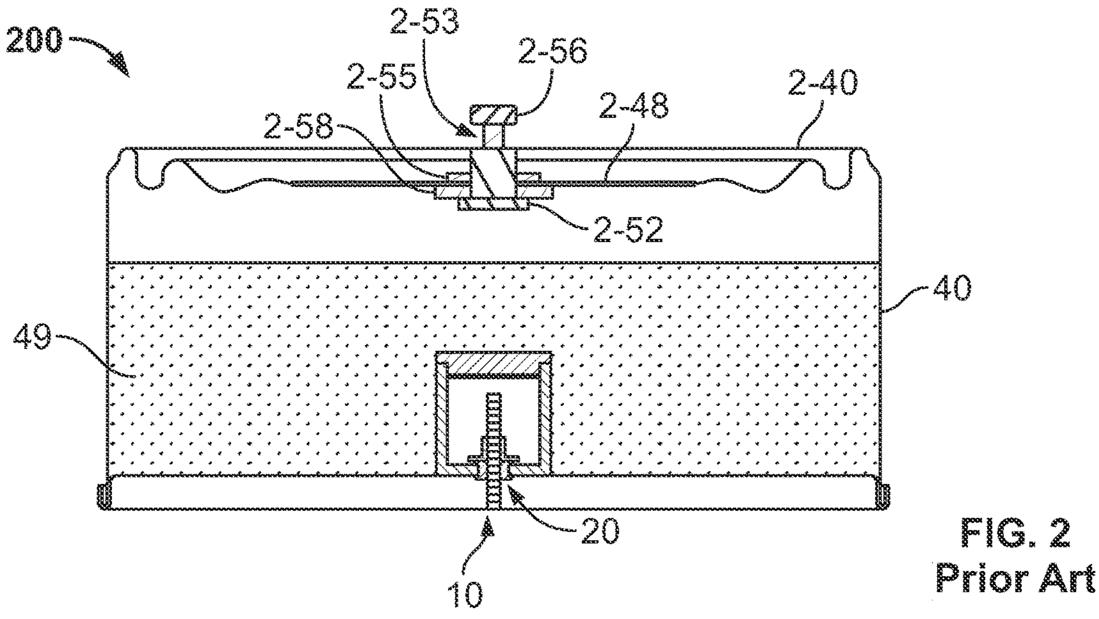
FIG. 2 Prior Art
FIG. 2 shows a partial cross section of a conventional stovetop fire suppressor for mounting under a micro-hood taken along the axial center.

FIG. 1 shows a cross section of a conventional stovetop fire suppressor for mounting under a vent-hood 100 and FIG. 2 shows a cross section of a conventional stovetop fire suppressor for mounting under a micro-hood 200. Both configurations shown in FIGS. 1 and 2 have a clevis pin 56 that is installed through a hole in the center of the can. This clevis pin/hole interface not only provides the connection between the fire suppressor container 40 and the mounting apparatus 50, it provides a leak path for air to escape when the can is heated during a normal cooking cycle and air can be drawn back in during cooling. A felt washer 58 positioned between the clevis pin 56 and the top 48 inner face of the container 40 or can serves as a filter. This filter 58 can prevent fire extinguishing powder from escaping out the top of the container. Conversely, the felt washer 58 can prevent debris from being drawn into the container containing fire extinguishing powder 49. In both configurations, the clevis pin 56 is held in place by a retaining ring 55 on the outer side of the top 48 of the container 40. Also shown are the container 40 bottom wall or lid 20 and fuse 10.

The air pathway provided by the space around the clevis pin 56 through the top 48 of can varies with tolerances of the clevis pins, even if the hole for the same is kept to very tight tolerances. It would be desirable to create a heat vent that was separate and independent from the mounting clevis pin. In accordance with embodiments of the present invention, a separate hole, or holes, is/are disposed with a desired tolerance level into the top of the container.

Figure 3A:
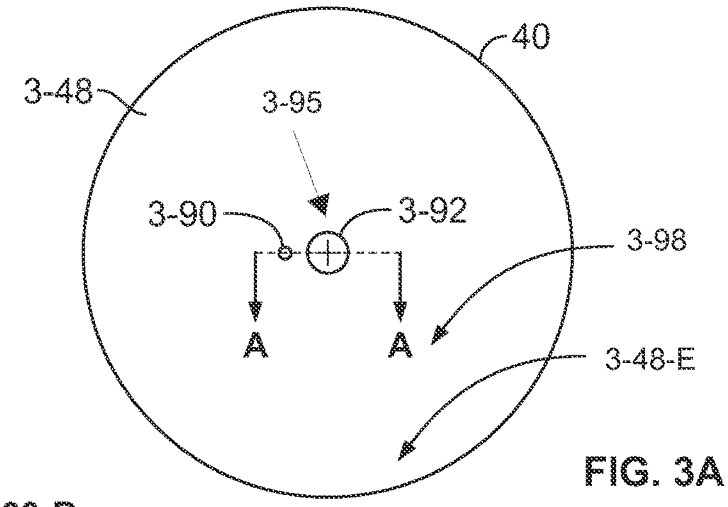
FIG. 3A shows a top view of a top of a stove top fire suppressor with a threaded insert of a mounting assembly, in accordance with an exemplary embodiment of the present invention.

FIG. 3A shows a top view of a top wall 3-48 of a stovetop fire suppressor container 40 in accordance with an exemplary embodiment of the present invention. From this view a vent hole 3-90 is shown displaced from the centered insert hole 3-92 in the top 3-48 of the container. A top edge of the threaded insert 3-95 of a mounting assembly, in accordance with an exemplary embodiment of the present invention, extends through hole 3-92 and seats beneath the top wall 3-48.

Figure 3B:
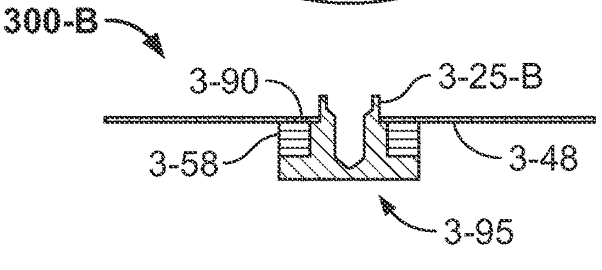
FIGS. 3B-3C show cross sections along line A-A of the top of the stove top fire suppressor with threaded insert of the mounting assembly of FIG. 3A at insertion and with staking, respectively, in accordance with an exemplary embodiment of the present invention.
Figure 3C:
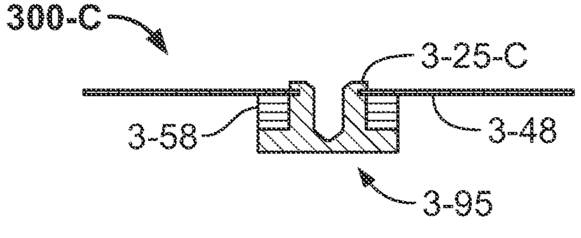

FIGS. 3B-3C show cross sections along line A-A 3-98 in FIG. 3A of a mounting assembly in accordance with an exemplary embodiment of the present invention of FIG. 3A at insertion 300-B and with staking 300-C, respectively, in accordance with an exemplary embodiment of the present invention. Line A-A does not extend to the edge 3-48-E of the top wall 3-48 of the container 40. Turning to FIG. 3B, the threaded insert 3-95 is inserted through hole 3-92 in the top 3-48 of the container. A felt washer 3-58 surrounds a shaft of the threaded insert and extends beneath the vent hole 3-90. Staking end 3-25-B are shown extended through the center hole 3-92 of the top 3-48 of the can. In FIG. 3C, the staking end is shown staked 3-25-C, securing the insert to the top 3-48 of the can and sandwiching the felt washer 3-58 between the inside of the top wall 3-48 and a shoulder base of the insert 3-95. The threaded insert is described in greater detail below with reference to FIGS. 8A-8D.

Figure 4A:
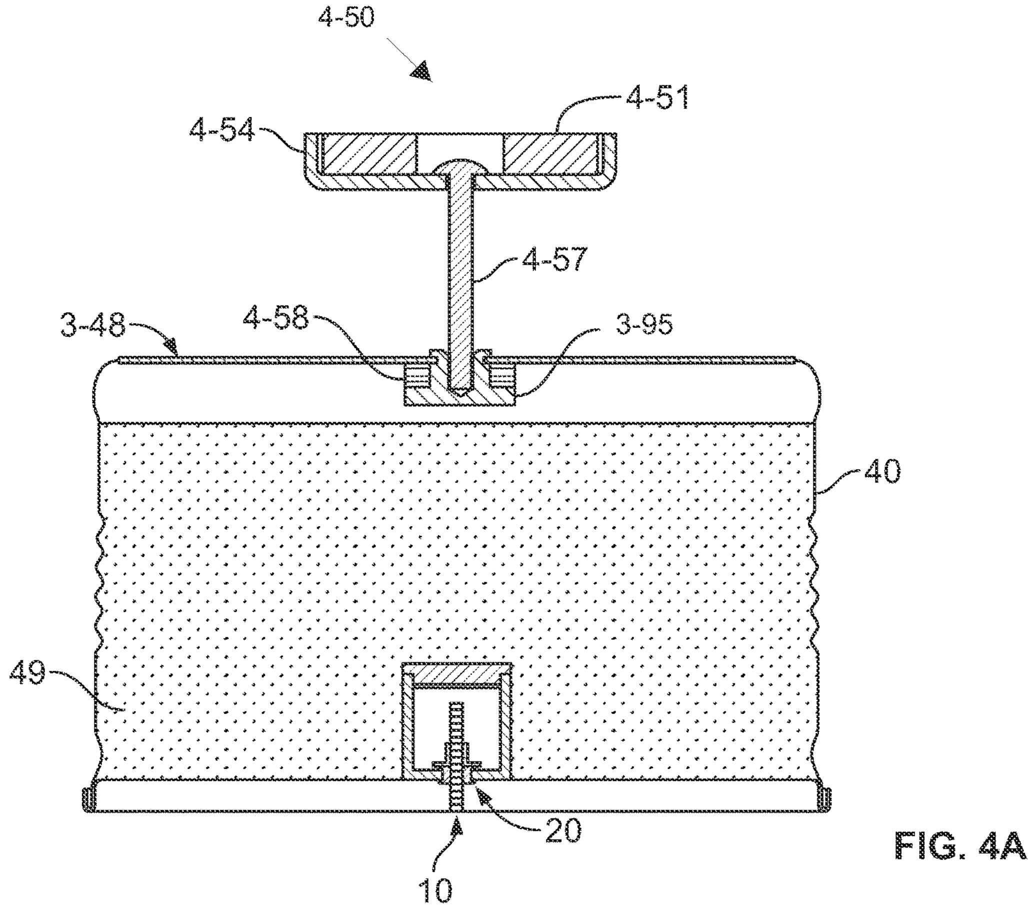
FIG. 4A shows a cross section of a stovetop fire suppressor with a vent -hood mounting assembly, in accordance with an exemplary embodiment of the present invention.

FIG. 4A shows a cross section of a vent-hood mounting assembly, in accordance with an exemplary embodiment of the present invention. The improved vent hood magnet attachment configuration consists of the improved vent hood can/threaded insert/felt washer assembly 40/3-95/4-58, a screw 4-57 and a magnet assembly 4-50 which includes a magnet 4-51 and a magnet housing 4-54. The lid assembly 20, fuse 10, container 40 and suppressant powder 49 volume may be similar to a conventional stovetop fire suppressor.

Figure 4B:
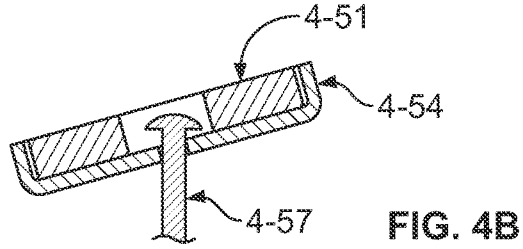
FIG. 4B shows an upper portion of a mounting assembly in greater detail, in accordance with an exemplary embodiment of the present invention.

FIG. 4B shows an upper portion of a screw or bolt or machine screw 4-57, a magnet housing 4-54 and magnet 4-51 in greater detail, in accordance with an exemplary embodiment of the present invention. An exemplary embodiment of screw 4-57 in accordance with the present invention is shown with more particularity FIGS. 9A and 9B. Referring again to FIG. 4B, the machine screw is fed through a hole in the magnet housing and is installed into the threaded insert 3-95, shown in FIG. 4A, for example. This assembly step can be automated for efficient production. This approach attaches the magnet to the can assembly at the fire suppressor manufacturer to provide a ready to use product with no assembly required by the end user. It also positively retains the magnet to prevent loss during shipping and installation. The magnet is free to pivot about the screw head, as shown in FIG. 4B, as well as rotate about the length of the bolt. This configuration also affords mounting on non-horizontal surfaces while keeping the bottom face of the container 40, shown in FIG. 4A, for example, parallel with the stovetop surface.

Figure 5:
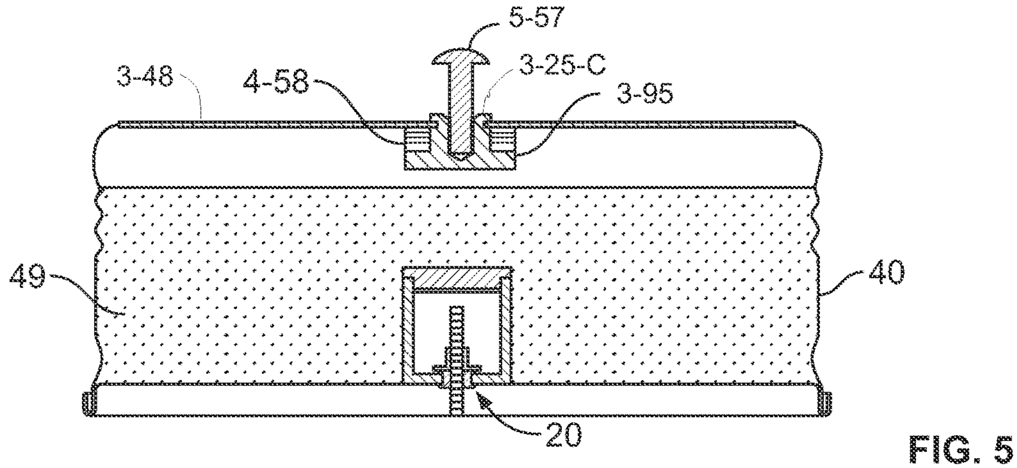
FIG. 5 shows a cross section of a stovetop fire suppressor with micro -hood mounting assembly, in accordance with an exemplary embodiment of the present invention.

FIG. 5 shows a cross section of a stovetop fire suppressor with micro -hood mounting assembly, in accordance with an exemplary embodiment of the present invention. The improved micro-hood attachment configuration consists of the improved micro-hood can/threaded insert/felt washer 3-40/3-95/4-58 assembly and a screw 5-57, where the container top 3-48 may comprise a vent hole, not shown. The lid assembly 20 and suppressant powder 49 volume may be unchanged as compared to conventional stovetop fire suppressors. The screw 5-57 in the micro-hood mounting assembly, FIG. 5, may be of different dimensions as compared to a screw in an exemplary dimensions of the vent hood mounting assembly, FIG. 4A. FIG. 5 also shows the stake end of the threaded insert 3-95 in a staked configuration 3-25-C.

A screw of desired length, compatible with the micro-hood fire suppressor assembly, is installed into the threaded insert. This assembly step can be automated for hands free production. The screw provides the same functionality as the undercut clevis pin in conventional micro-hood fire suppressor, shown for example in FIG. 2.

Figure 6A:
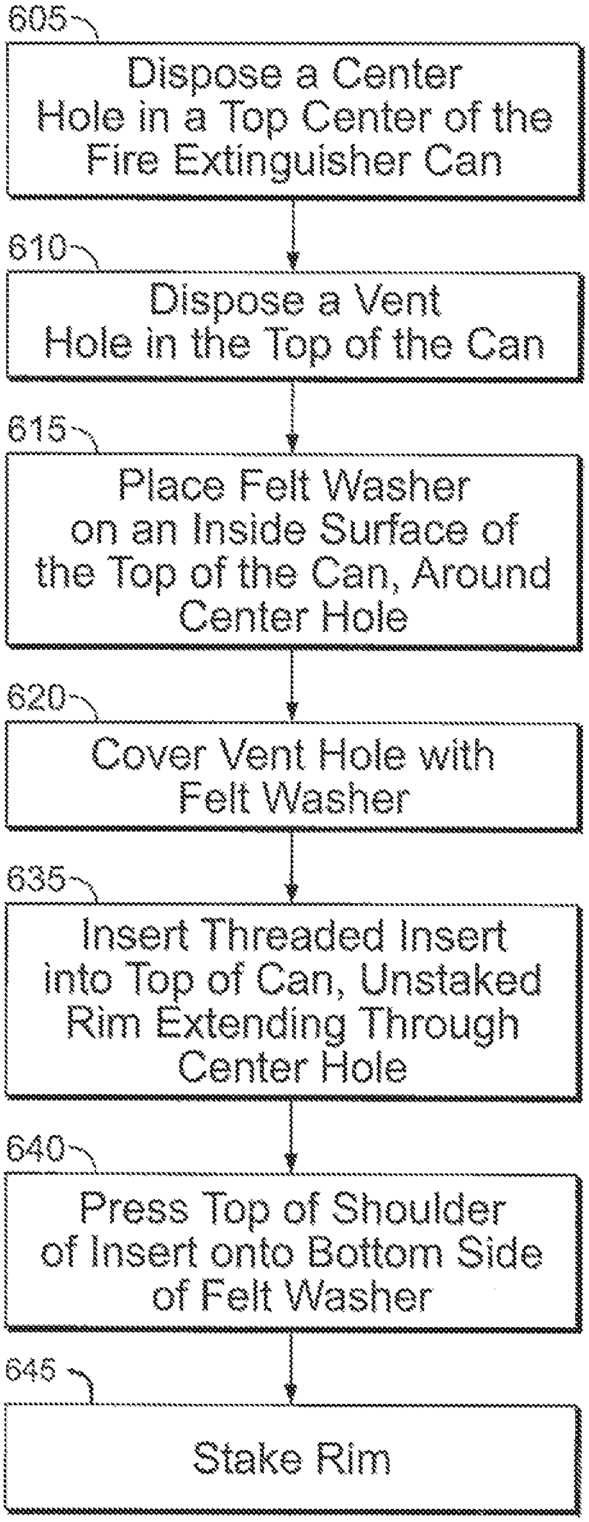
FIGS. 6A and 6B show a respective method of making a mounting device for a stovetop fire suppressor container, in accordance with an exemplary embodiments of the present invention.
Figure 6B:
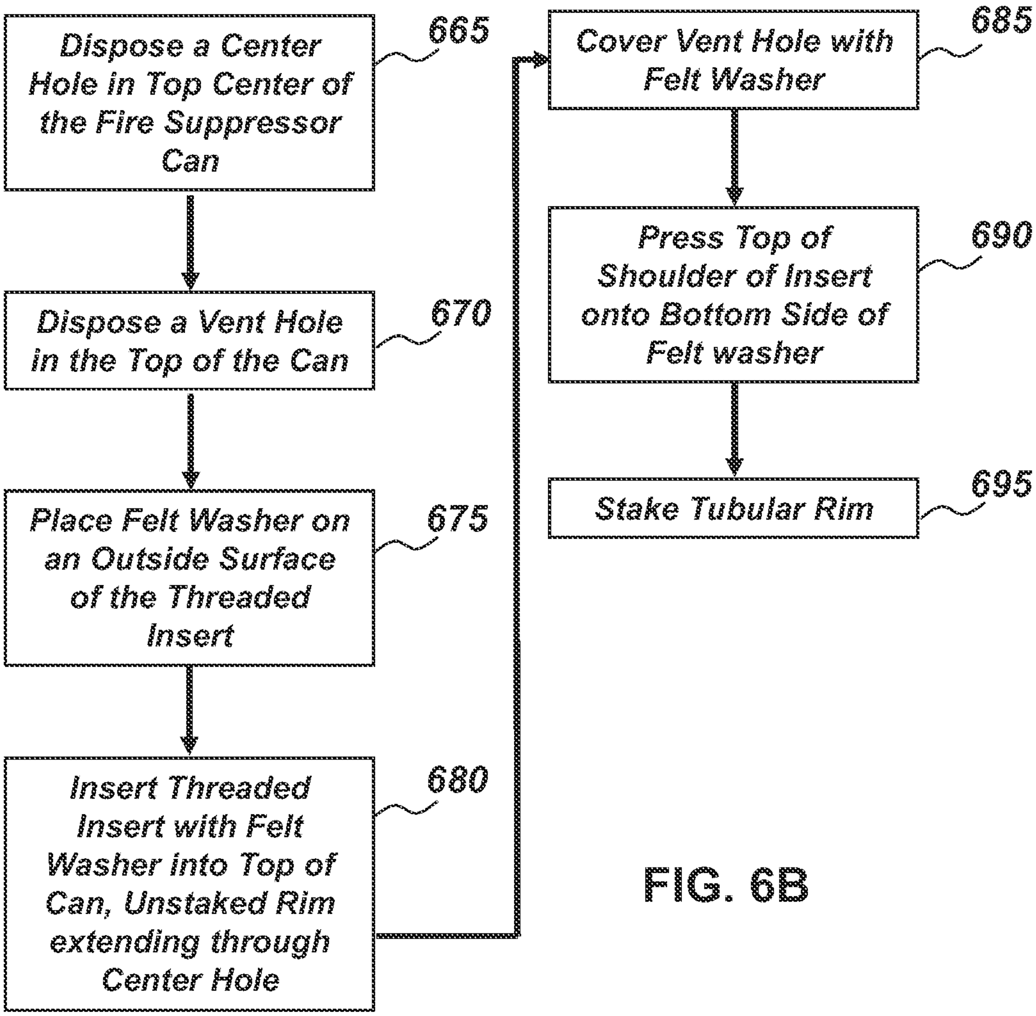

FIGS. 6A and 6B show a respective method of making a mounting device for a stovetop fire suppressor container, in accordance with an exemplary embodiments of the present invention. Beginning with a stovetop fire suppressor container and referring to FIG. 6A, dispose a center hole in the top center of the stovetop fire suppressor can 605. Additionally, dispose a vent hole in the top of the can 610. In alternate embodiments the number, size, and placement of vent holes may vary. Place a felt washer on an inside surface of the top of the can around the center hole 615. Cover the vent hole with the felt washer 620. Alternatively, the felt washer may be placed around the shaft of the threaded insert. Insert the threaded insert into the top of the can, unstaked, with the rim extending through the center hole 635. Press the top of the shoulder of the threaded insert onto the bottom side of the felt washer 640. Stake the rim of the insert, securing it to the top of the can 645. Alternate embodiments of the above described method may be employed in keeping with the present invention, for example, the felt washer may be placed around the shaft of the threaded insert. FIG. 6B shows another exemplary method of making a mounting device for a stovetop fire suppressor container. Referring to FIG. 6B, dispose a center hole in the top center of the stovetop fire suppressor can 665. Additionally, dispose a vent hole in the top of the can 670. Place a felt washer on an outside surface of the threaded insert 675. Insert the threaded insert with felt washer into the top of the can, unstaked, with the rim extending through the center hole 680. Cover the vent hole with the felt washer 685. Press the top of the shoulder of the threaded insert onto the bottom side of the felt washer 690. Stake the tubular rim of the insert, as shown for example in FIG. 3C, 3-25-C, securing it to the top of the can 695.

Figure 7A:
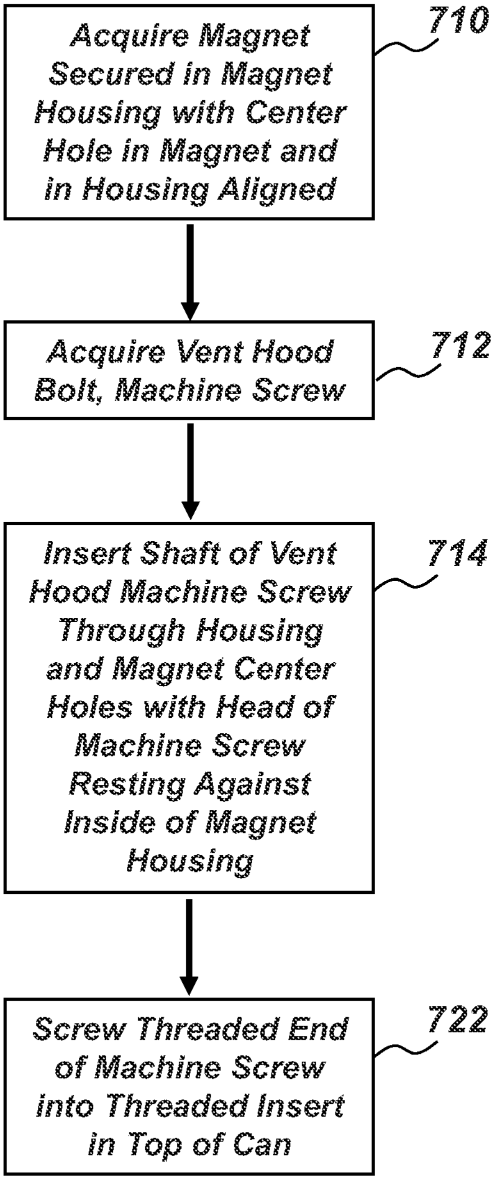
FIGS. 7A-7B show a method of mounting a vent hood stovetop fire suppressor and a micro-hood, respectively, in accordance with exemplary embodiments of the present invention.
Figure 7B:
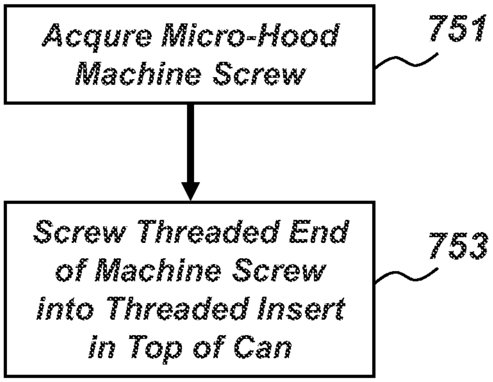

FIGS. 7A-7B show a method of mounting a vent hood stovetop fire suppressor and a micro-hood, respectively, in accordance with exemplary embodiments of the present invention. Turning to FIG. 7A, acquire a magnet secured in a magnet housing, wherein the magnet and the housing have centered holes and these holes are aligned 710. Obtain a vent hood machine screw 712. Insert the shaft of the vent hood machine screw through the magnet and magnet housing center holes with the head of the resting against the magnet housing 714, shown for example in FIG. 4B. Returning to FIG. 7A, screw the threaded end of the machine screw into the threaded insert, which is staked to the top of the can 722. An exemplary method of mounting a stovetop fire suppressor in a micro -hood, in accordance with the present invention, includes acquiring a micro-hood machine screw 751, shown for example in FIG. 5. Turning again to FIG. 7B, the exemplary method continues with screwing the threaded end of the micro-hood machine screw into the threaded insert, staked into the top of the stovetop fire suppressor container 753.

Figure 8A:
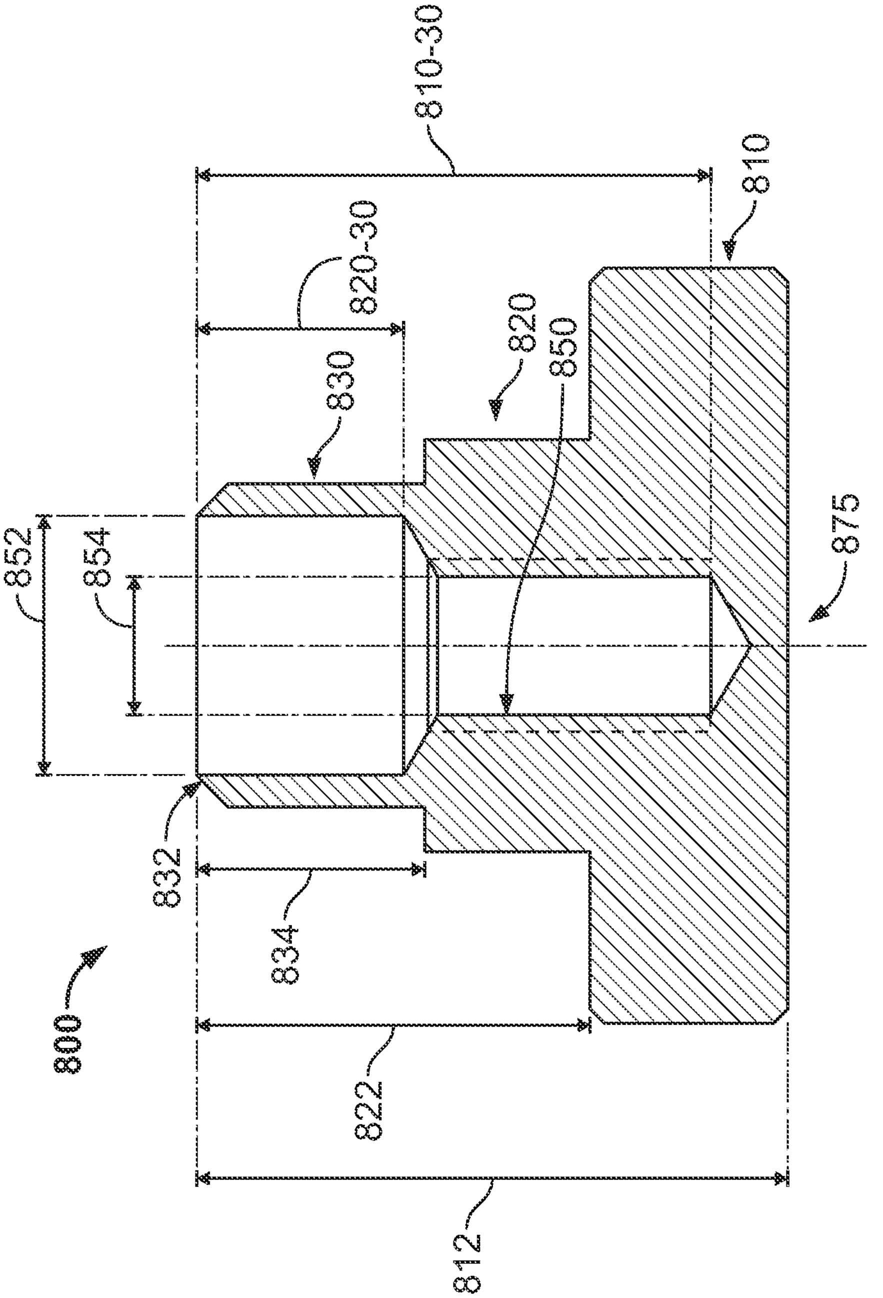
FIGS. 8A-8D show an exemplary threaded insert, in accordance with an exemplary embodiment of the present invention a cross sectional of a side view along axial center, top, side and bottom views, respectively.

FIG. 8A shows a cross sectional view along the axis center 875 of an exemplary threaded insert 800, in accordance with an exemplary embodiment of the present invention. In accordance with an exemplary embodiment, the insert may be made from aluminum bar stock. In accordance with an exemplary embodiment of the present invention, the insert is mechanically staked to the top of the container. The threaded insert has a shoulder 810, shaft 820 and stake 830. The inner diameter 852 of the stake is greater than the inner diameter of the shaft 854. Upon insertion and assembly the shaft 820 passes through a felt washer, while the stake 830 passes through a hole in the top of the container, as shown for example in FIG. 4A. The felt washer may be made from an alternate material. Referring again to FIG. 8A, the top of the stake is chamfered 832.

Figure 8B:
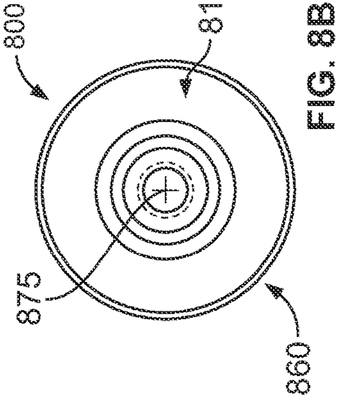
Figure 8C:
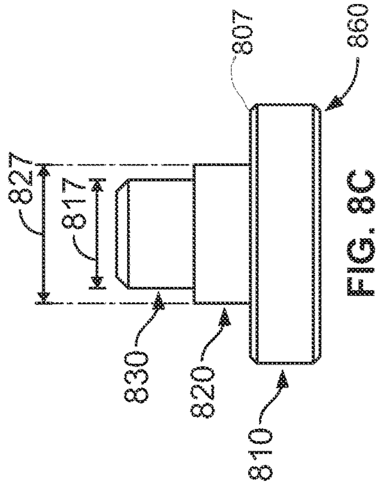
Figure 8D:
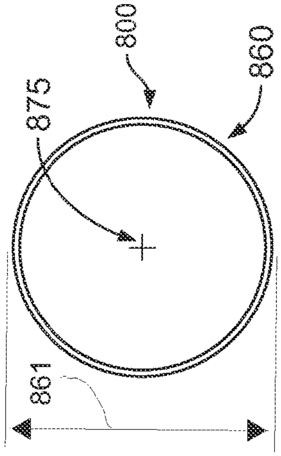

FIG. 8B shows a top view of an exemplary threaded insert, in accordance with an exemplary embodiment of the present invention and FIG. 8C shows a side view of an exemplary threaded insert, in accordance with an exemplary embodiment of the present invention. FIG. 8D shows a bottom view of an exemplary threaded insert, in accordance with an exemplary embodiment of the present invention. From the bottom view, FIG. 8D, the axial center 875, and the outer shoulder bottom chamfer 860 of the threaded insert 800 are shown.

Referring across FIGS. 8A through 8D, the outer diameter 861 of the shoulder 810 steps down to a smaller outer diameter 827 of the shaft 820 and the shaft outer diameter steps down to a smaller outer diameter 817 of the stake 830. Exemplary dimensions with reference to FIGS. 8A to 8D are in accordance with an exemplary embodiment. Alternate embodiments may comprise some or all exemplary dimensions or alternate dimensions as needed or desired. For example, the inner 852, FIG. 8A, and outer diameter 827, FIG. 8C, of the stake 830, FIG. 8A, are 0.17 inches and 0.211±0.001 inches, respectively. As shown in FIG. 8B, the entire threaded insert is circular. In turn the stake end, or rim, 830, FIG. 8A, is circumferential or tubular, in accordance with an exemplary embodiment of the present invention. An exemplary height 812 of the threaded insert 800 is 0.4 inches with an exemplary stake height 834 of 0.15 inches, and an exemplary shaft height 822 is 0.25 inches. The outer diameter 861 of the shoulder 810 may be 0.50 inches and may be chamfered on its top 807 and bottom 860. An exemplary and threaded inner diameter 854 of the shaft and shoulder are 0.9 inches, shown in FIG. 8A.

Figure 9A:
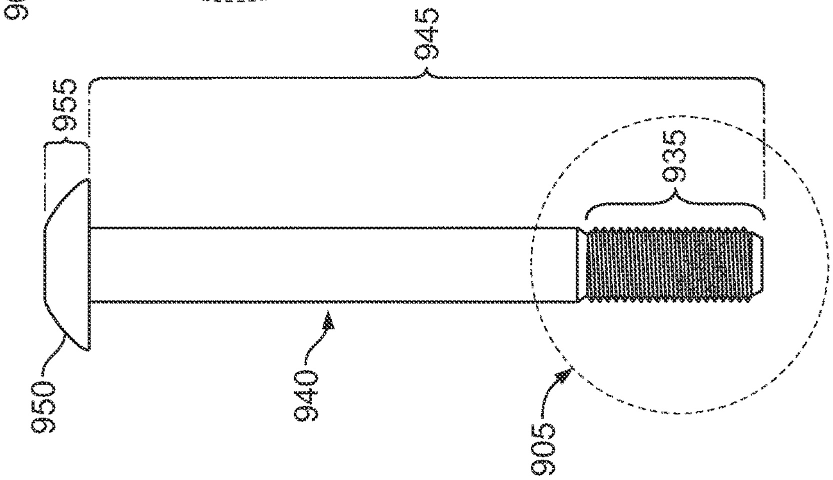
FIG. 9A shows an exemplary machine screw for attaching a magnet housing to a threaded insert installed in a fire extinguishing container in accordance with an exemplary embodiment of the present invention.

FIG. 9A shows an exemplary machine screw for attaching a magnet housing to a threaded insert installed in a fire extinguishing container, in accordance with an exemplary embodiment of the present invention. The dimensions provided are exemplary and variations of any and all dimensions can be made as needed or desired. The machine screw to magnetic housing connection, like the conventional split ring, allows the fire extinguishing container to swivel and tilt. The attachment further allows movement of the container upon activation of the stovetop fire suppressor. The machine screw shaft 945 may be 1.0 inch with a threaded end portion 935 and a non-threaded upper portion 940. The height 955 of the head 950, in accordance with an exemplary embodiment is 0.065 inches.

Figure 9B:
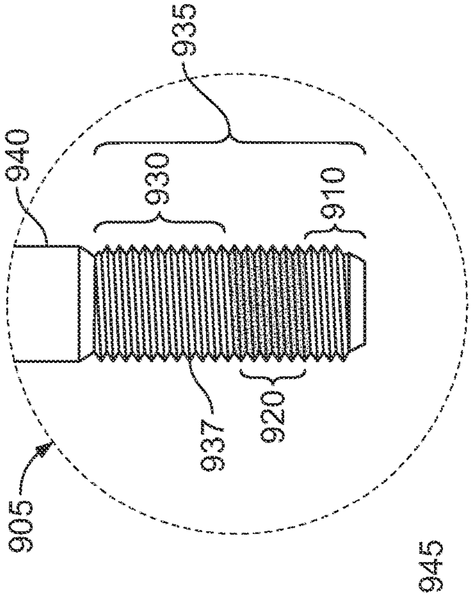
FIG. 9B shows a portion of FIG. 9A in greater detail.
Figure 10:
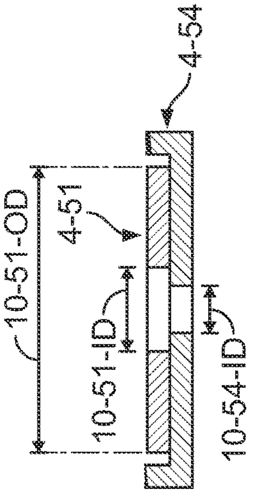
FIG. 10 shows a cross section of side view taken along axial center of an exemplary magnet and magnet housing, in accordance with an exemplary embodiment of the present invention.

FIG. 9B shows section 905 of FIG. 9A in greater detail. In accordance with an exemplary embodiment of the present invention, a nylon patch 920 of three to six threads follows one to five threads of insert threads 910. The nylon patch on a stainless steel bolt, in accordance with exemplary embodiments of the present invention acts as a thread locker. The nylon patch connects to additional machine screw material threads 930, for example stainless steel, to yield a threaded machine screw portion 935 of about 0.25 inches. In accordance with an exemplary embodiment the machine screw or screw is passivated prior to application of a nylon patch. In accordance with an exemplary embodiment a minimum nylon patch length is 4 threads and a maximum start or insert pitch length is 5 thread pitches from the end. Exemplary thread 937 dimensions, not shown, include a major diameter of 0.1112 inches and a pitch diameter of 0.095 inches, where internal threads in the threaded insert mate with machine screw threads having a major diameter of 0.1112 inches and a pitch diameter of 0.0950 inches FIG. 10 shows a cross section of side view taken along axial center of an exemplary magnet and magnet housing, in accordance with an exemplary embodiment of the present invention. The inner and outer diameters are exemplary and alternate diameters can be used in accordance with alternate embodiments of the present invention. An exemplary outer diameter 10-51-OD of the magnet 4-51 is 1.25 inches. The inner diameter 10-54-ID of the magnet housing 4-54 is 0.2 inches in accordance with an exemplary embodiment. And an exemplary inner diameter 10-51-ID of the magnet 4-51 is 0.375 inches, in accordance with an exemplary embodiment of the present invention. An exemplary screw head outer diameter, not shown, is 0.257 inches, where the machine screw may be a stainless steel 18-8 type of 0.11 inch diameter.

The present invention utilizes common parts across the micro-hood and vent hood stovetop fire suppressors, reducing inventory count. The design in accordance with embodiments of the present invention can be automated for greater efficiency of time and labor and can provide increased production or throughput. In accordance with embodiments of the present invention the magnet is attached at the factory for the vent hood product, eliminating assembly by the end user. This attachment also alleviates loss or misplacement of the magnet during unpacking or installation. The threaded insert is staked to the fire suppressor can and can provide a more positive retention as compared to the current retaining ring. The vent area in the top of the container can be made more consistent, in accordance with embodiments of the present invention, as compared to the conventional product.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiments and after consideration of the appended drawings.

What is claimed is:

1. A mounting device for a stovetop fire suppressor, the device comprising:

a threaded insert disposed in a top wall of the stovetop fire suppressor;

a felt washer in juxtaposition with a shoulder of the threaded insert; and wherein, the threaded insert has a top rim for staking to a top of a stovetop fire suppressor container.

2. A mounting device for a stovetop fire suppressor, the device comprising:

a threaded insert disposed in a top wall of the stovetop fire suppressor;

a felt washer in juxtaposition with a shoulder of the threaded insert; and internal threads in the threaded insert mated with machine screw threads having a major diameter of 0.1112 inches and a pitch diameter of 0.0950 inches.

3. The device according to claim 2, further comprising:

a stainless steel 18-8 machine screw mated to the internal threads of the threaded insert.

4. The device according to claim 3, further comprising:

a nylon patch in the threaded portion of the bolt.

5. The device according to claim 4, further comprising:

the nylon patch minimum length is four thread pitches.

6. A mounting device for a stovetop fire suppressor, the device comprising:

a threaded insert staked to a top of a stovetop fire suppressor container;

a felt washer sandwiched between a shoulder of the threaded insert and an inner side of the top of the stovetop fire suppressor container;

a vent hole in the top the stovetop fire suppressor container, wherein the felt washer covers the vent hole;

a machine screw of 0.11 inch diameter threaded into the internal threads of the threaded insert; and a magnet housing with a center opening greater than an outer diameter of a shaft of the machine screw and less than the diameter of a head of the machine screw secured to the top of the stovetop fire suppressor container via the machine screw.

7. A method of making a mounting device for a stovetop fire suppressor, the method comprising:

creating a center hole in a top of a stovetop fire suppressor container;

inserting a threaded insert which has a felt washer in juxtaposition with a shoulder of the threaded insert through the center hole; and mechanically staking a top rim of the threaded insert to an outer side of the top of a stovetop fire suppressor container.

8. The method of making a mounting device according to claim 7, further comprising:

creating a vent hole in the top of a stovetop fire suppressor container.

9. The method of making a mounting device according to claim 7, further comprising:

sandwiching a felt washer between a shoulder of the threaded insert and an inner side of a top wall of the stovetop fire suppressor.

10. The method of making a mounting device according to claim 8, further comprising:

sandwiching a felt washer between a shoulder of the threaded insert and an inner side of a top wall of the stovetop fire suppressor and covering the vent hole with the felt washer.

11. The method of making a mounting device according to claim 7, further comprising:

machining and tapping a piece of 0.50 inch aluminum bar stock to make the threaded insert.

12. The method of making a mounting device according to claim 11, further comprising:

machining a chamfer on a top of the threaded insert and on a bottom shoulder of the threaded insert.

13. The method of making a mounting device according to claim 11, further comprising:

machining a shaft diameter above a shoulder diameter; and machining an inner and an outer stake rim diameter, respectively, above the shaft diameter.

* * * * *